Figure 3:
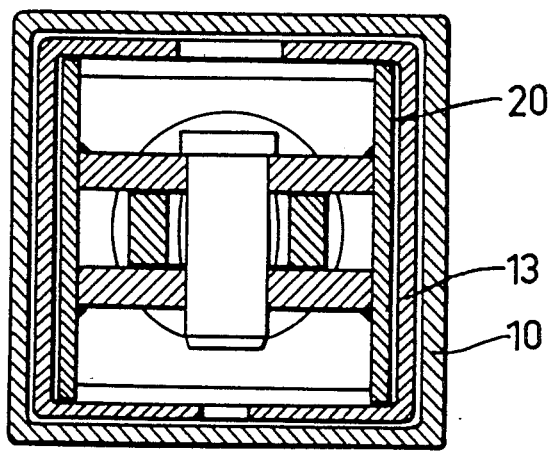

United States Patent [19]

Kjellqvist

[11] Patent Number: 4,613,147
[45] Date of Patent: Sep. 23, 1986

[54] REAR UNDERRIDE BUMPER AND SIDE-DRAFT SUPPORT

[75] Inventor: Gösta Kjellqvist, Vålberg, Sweden

[73] Assignee: AB Mahler & Soner, Rosson, Sweden

[21] Appl. No.: 775,048

[22] PCT Filed: Dec. 12, 1984

[86] PCT No.: PCT/SE84/00422
§ 371 Date: Aug. 12, 1985
§ 102(e) Date: Aug. 12, 1985

[87] PCT Pub. No.: WO85/02588
PCT Pub. Date: Jun. 20, 1985

[30] Foreign Application Priority Data

Dec. 12, 1983 [SE] Sweden .............................. 8306854

[51] Int. Cl.⁴ .............................................. B60D 1/14
[52] U.S. Cl. .................................... 280/473; 280/770; 293/114; 293/117
[58] Field of Search .................. 280/473, 472, 770; 293/104, 114, 117, 119; 172/274

[56] References Cited

U.S. PATENT DOCUMENTS 4,215,496 8/1980 Wehr .................................. 293/114
4,358,129 11/1982 Thomas .............................. 280/473
4,419,038 12/1983 Pendergast ......................... 293/117

Primary Examiner—John J. Love
Assistant Examiner—Donn McGiehan
Attorney, Agent, or Firm—Cushman, Darby & Cushman

[57] ABSTRACT

A rear underride protection (1) intended for vehicles (2) comprising a bar (10) transversal to the direction of motion of the vehicle (2) and fixed to the vehicle (2), and a movable bar (13) displaceably arranged in the longitudinal direction of the fixed bar (10). At one end the movable bar (13) has a means of attachment (14) to enable fitting of an implement, e.g. in the form of a side-plough (3). The projection of the movable bar (13) can be adjusted at one's option and the sliding motion be effected by means of a double-acting hydraulic cylinder to which oil is supplied from the forced oil system of the vehicle (2). The hydraulic cylinder actuates the movable bar (13) by a buffer means, the purpose of which is to spare the rear underride protection (1) and implements connected to this great mechanical stresses. When the rear underride protection (1) is not connected to any implement the movable bar (13) is operated to a position where the means of attachment (14) does not project outside the lateral surface of the vehicle (2).

7 Claims, 4 Drawing Figures

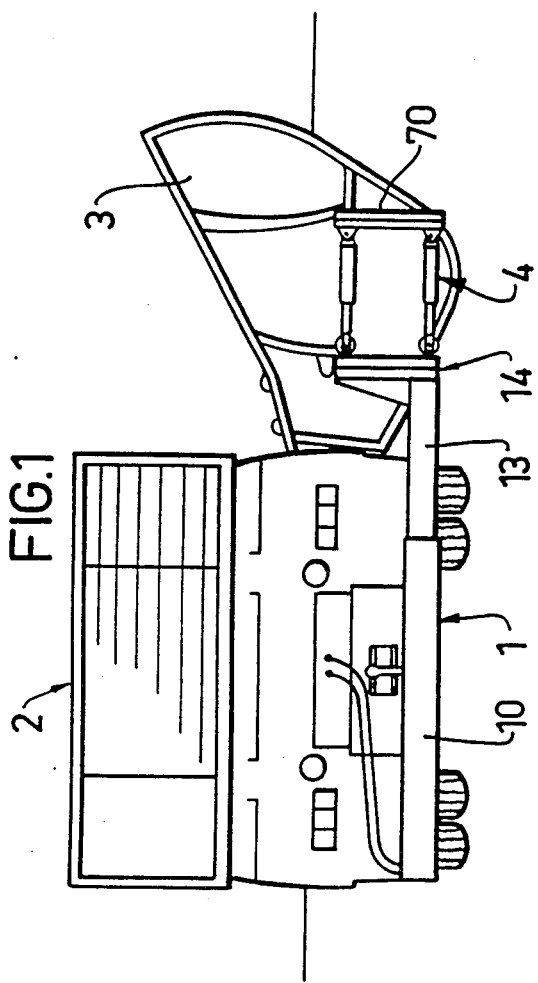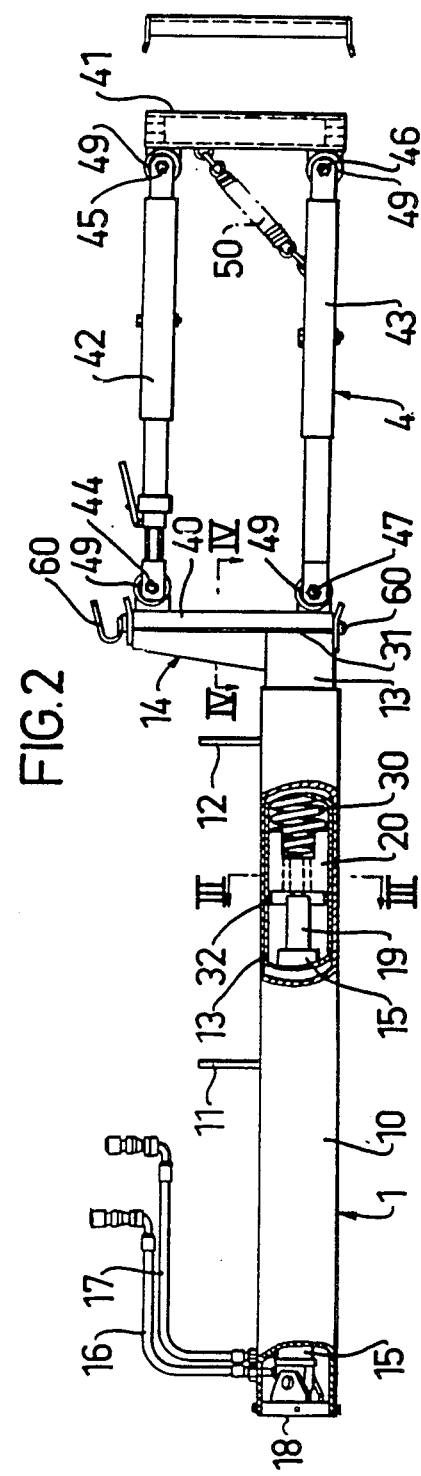

REAR UNDERRIDE BUMPER AND SIDE-DRAFT SUPPORT

This invention relates to a rear underride protection for vehicles, especially trucks, comprising a fixed bar transversal to the direction of motion of the vehicle and means for securing the fixed bar relative to the vehicle.

Vehicles having a backwards projecting loading surface or the like are normally provided with a so-called rear underride protection primarily to reduce the risk of severe injuries resulting from accidents at collisions from behind. Moreover, such vehicles as carry a lateral plough in connection with snow clearing are also provided with a so-called sliding bar which is normally connected with a rear attachment of the lateral plough. The sliding bar is further usually detachably connected to the vehicle at the latter's connection means for a trailer. The sliding bar enables a stepless adjustment of desired ploughing width. This is achieved in that the length of the sliding bar is variable, simultaneously as the lateral plough is articulatedly connected to the vehicle at its front portion.

The sliding bar described above has i.a. the following shortcomings. In order to have access to the drawing means of the vehicle and thus to have a possibility of connecting a trailer to the vehicle the sliding bar must be disconnected from the current vehicle between different ploughing occasions. Accordingly the sliding bar must be mounted onto the vehicle at each turn-out which is both time-consuming and toilsome. Another disadvantage is that the blocking of the sliding bar of the drawing means of the vehicle makes a simultaneous connection of a trailer to the vehicle impossible, resulting in that e.g. trailers for spreading salt or sand cannot be connected to the drawing means of the vehicle to be brought along in ploughing.

It is the object of this invention to provide a rear underride protection with a built-in sliding bar not having said disadvantages, and this object is achieved by the device having the characteristic features defined in the claims.

One advantage of the invention in comparison with previously known solutions is that the rear underride bumper and side-draft support of the invention, which is permanently mounted on the vehicle, continuously offers an attachment e.g. for an implement in the form of a lateral plough, simultaneously as the drawing means of the vehicle will not be blocked, as described above. That is to say, the rear underride protection of the invention also comprises a continuously available sliding bar which is very suitable to use in combination with a later described intermediate strut in order to obtain e.g. different angles of incidence of a lateral plough.

Figure 4:
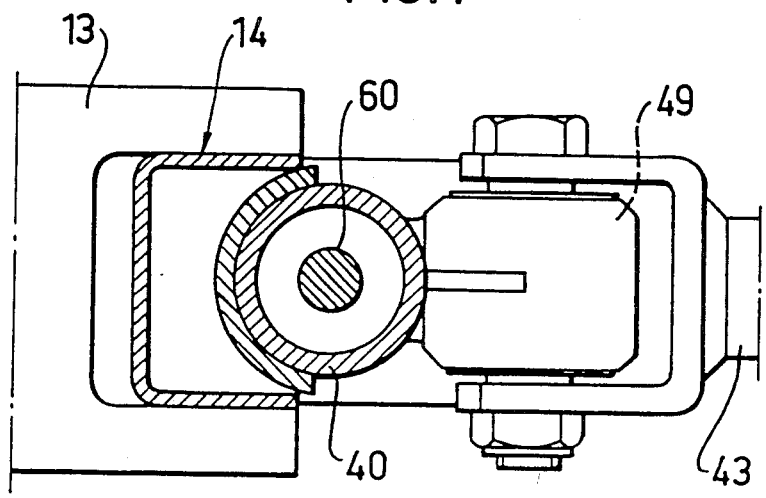

Illustrative examples of the invention will be described more in detail in the following with reference to the enclosed drawings, in which FIG. 1 is a view from behind of a vehicle on which a rear underride bumper and side-draft support according to the invention is mounted, FIG. 2 shows on a larger scale and partly in section the device of the invention in a state detached from the vehicle inclusive of the intermediate portion, FIG. 3 shows on a larger schale a section along the line III—III in FIG. 2, and FIG. 4 shows on a larger scale a section along the line IV—IV in FIG. 2.

FIG. 1 shows a rear underride bumper and side-draft support 1 according to the invention which is mounted at the rear end of a vehicle in the form of a truck 2, which is provided with a lateral plough 3. The lateral plough 3 is in front articulatedly connected to the truck 2 and at the back connected to the rear underride bumper and side-draft support 1 via an intermediate portion 4.

The rear underride bumper and side-draft support 1 comprises a fixed bar 10 and two attachments 11, 12 connected to this so that the fixed bar 10 can be adapted to the frame of the vehicle 2 e.g. by means of screws. The rear underride protection 1 further comprises a movable bar 13 displaceably arranged in the longitudinal direction of the fixed bar 10, which bar 13 at one of its two ends has a means of attachment 14 which in the example shown articulatedly supports the intermediate portion 4 as seen in the longitudinal direction of the vehicle. The axial displacement of the movable bar 13 is achieved by means of a so-called double-acting hydraulic cylinder 15 which is supplied with oil via two hoses 16, 17 intended to be connected to the forced oil system of the truck 2.

At one of its ends the hydraulic cylinder is connected to the fixed bar 10 via an end washer 18. The piston 15 of the hydraulic cylinder 19 is at its free end connected to a means 20 slideably arranged within the bar 13. Within the movable bar 13 there is arranged a buffer means in the form of a prestressed compression spring 30 engaging the end 31 of the bar 13 and the sliding means 20. Normally the spring 30 forced the spring 30 to contact with a stop means 32 arranged within the bar 13. Thus, a suitable prestress of the spring 30 can be chosen by adapting the stop means 32 to the bar 13 in a suitable position.

If an extraordinary load is for instance applied to the lateral plough 3 so that a great force arises tending to move the bar 13 further into the bar 10 a gap may result between the stop means 32 and the sliding means 20, i.e. the plough 3 is given a possibility of springing away, and in this way the vehicle 2 as well as the device of the invention is spared great impact stresses.

The intermediate portion 4 mentioned above comprises two vertical tube portions 40, 41 and two horizontal arms 42, 43 the length of which can be adjusted. As is evident from FIG. 2 the tube portions 40, 41 and the arms 42, 43 are articulatedly connected to one another at four fulcrums 44–47, which have been made elastic by means of an elastic damping means 49. Moreover, a draw spring 50 is arranged between the arm 43 and the tube portion 41.

The intermediate portion 4 can be articulatedly connected to the means of attachment 14, as shown in FIGS. 2 and 4, by means of a pin 60 going through the tube portion 40. In the same way the tube portion 41 can be articulated connected to e.g. the side plough 3. If desired, the intermediate portion can for instance be supplemented with a diagonally operating hydraulic cylinder or the like to obtain a lifting possibility for the side plough or in order to obtain an increase of the contact pressure of the plough against the support.

Normally the intermediate portion 4 is left on the side plough 3 even when this is disconnected from the vehicle 2, and as the length of the arms 42, 43 can be adjusted the cutting angle of the side plough 3 can be simply adjusted as desired. When the vehicle 2 is to be used for snow ploughing the rear attachment 70 of the side plough 3 is thus connected via the intermediate portion 4 to the means of attachment 14 of the rear underride bumper and side-draft support 1. By operating thereafter the movable bar 13 by means of the hydraulic cylinder 15 so that the desired ploughing width is obtained the side plough 3 is ready for use. After disconnecting the side plough 3 and the intermediate portion 4 the movable bar 13 is operated to a position where the means of attachment 14 does not project outside the lateral surface of the vehicle 2.

Of course it should be realized that the invention is not restricted to what has been shown and described, but changes and modifications thereof are possible within the scope of the appended claims.

I claim:

1. A rear underride bumper and side-draft support (1) for vehicles, especially for trucks (2) comprising a fixed bar (10) transversal to the direction of motion of the vehicle (2) and means (11, 12) for securing the fixed bar (10) relative to the vehicle (2), characterized in that it (1) comprises a movable bar (13) displaceably arranged in the longitudinal direction of the fixed bar (10), means (15) for effecting the displacement of the moveable bar (13), the movable bar (13) having a means of attachment (14) at one of its two ends to enable the fitting of implements.

2. The rear underride bumper and side-draft support as claimed in claim 1, characterized in that the fixed bar (10) is hollow and that at a mounted rear undrride protection (1) one end of the movable bar (13) is located inside the fixed bar (10), irrespective of the axial position of the movable bar (13).

3. The rear underride bumper and side-draft support as claimed in claim 1, characterized in that the movable bar (13) is hollow and that a buffer means (30) is arranged inside the movable bar (13).

4. The rear underride bumper and side-draft support as claimed in claim 3, characterized in that a sliding means (20) is movably arranged inside the movable bar (13) in its longitudinal direction, that the buffer means (30) is located between the sliding means (20) and the means of attachment (14), that a stop means (32) is arranged on the inside, is connected to the movable bar (13) and is located at the end of the sliding means (20) facing away from the buffer means (30), and that the displacing means (15) is connected to the sliding means (20) and to the fixed bar (10).

5. The rear underride bumper and side-draft support as claimed in claim 4, characterized in that the buffer means consists of a compresion spring (30) which is arranged with prestress owing to the axial location of the stop means (32) in the movable bar (13).

6. The rear underride bumper and side-draft support as claimed in claim 1, characterized in that the displacing means consists of a double-acting hydraulic cylinder (15).

7. The rear underride bumper and side-draft support as claimed in claim 1, characterized in that the means of attachment (14) comprises a vertical pin (60).

* * * * *